United States Patent
de Roover et al.

(10) Patent No.: US 7,574,327 B2
(45) Date of Patent: Aug. 11, 2009

(54) ALL-DIGITAL CANTILEVER CONTROLLER

(75) Inventors: Dirk de Roover, Sherwood, OR (US);
La Moyne L. Porter, II, Menlo Park, CA (US); Abbas Emami-Naeini, Los Altos, CA (US)

(73) Assignee: SC Solutions, Sunnyvale, CA (US)

( * ) Notice: Subject to any disclaimer, the term of this patent is extended or adjusted under 35 U.S.C. 154(b) by 107 days.

(21) Appl. No.: 11/638,116

(22) Filed: Dec. 12, 2006

(65) Prior Publication Data

US 2008/0140343 A1     Jun. 12, 2008

(51) Int. Cl.
*G06F 19/00* (2006.01)
(52) U.S. Cl. .................................. 702/189; 702/188
(58) Field of Classification Search ................ 702/106, 702/66, 75, 90, 91, 167, 168, 188, 189; 708/204
See application file for complete search history.

(56) References Cited

U.S. PATENT DOCUMENTS

| | | | |
|---|---|---|---|
| 4,861,990 A * | 8/1989 | Coley | 250/306 |
| 5,224,376 A * | 7/1993 | Elings et al. | 73/105 |
| 5,543,614 A | 8/1996 | Miyamoto et al. | |
| 5,569,918 A | 10/1996 | Wang | |
| 5,619,139 A | 4/1997 | Holczer et al. | |
| 5,805,448 A | 9/1998 | Lindsay et al. | |
| 5,966,053 A * | 10/1999 | Durig et al. | 331/116 M |
| 6,181,131 B1 | 1/2001 | Bruland et al. | |
| 6,530,266 B1 | 3/2003 | Adderton et al. | |
| 6,672,144 B2 | 1/2004 | Adderton et al. | |
| 6,676,813 B1 | 1/2004 | Pelekhov et al. | |
| 6,810,720 B2 | 11/2004 | Adderton et al. | |
| 6,910,368 B2 | 6/2005 | Ray | |
| 6,976,185 B1 | 12/2005 | Plants et al. | |
| 7,017,398 B2 | 3/2006 | Adderton et al. | |
| 7,036,357 B2 | 5/2006 | Adderton et al. | |
| 7,038,507 B2 | 5/2006 | Williams | |
| 7,039,148 B1 | 5/2006 | Lamb et al. | |
| 7,042,252 B2 | 5/2006 | Galloway et al. | |
| 7,042,972 B2 | 5/2006 | Fahim | |
| 7,044,007 B2 | 5/2006 | Struckmeier et al. | |

OTHER PUBLICATIONS

Albrecht, T.R. et al. "Frequency modulation detection using high-Q cantilevers for enhanced force microscope sensitivity", Jan. 15, 1991, pp. 668-673, *Journal of Applied Physics*, vol. 69, No. 2.

(Continued)

*Primary Examiner*—Edward R Cosimano
*Assistant Examiner*—Douglas N Washburn
(74) *Attorney, Agent, or Firm*—Michael A. Glenn; Glenn Patent Group

(57) ABSTRACT

An all-in-one digital cantilever controller applicable to all SFM systems is disclosed that can perform many relevant experiments for cantilever control in scanned force microscopy. A compact optimized digital implementation replaces analog components associated with cantilever signal processing and control. It has minimal thermal drift, at least an order of magnitude less than analog components. It has a number of meaningful tuning parameters available, as well as a user-friendly graphical interface (GUI) for adjusting those tuning parameters and performing different types of experiments.

14 Claims, 4 Drawing Sheets

OTHER PUBLICATIONS

Dürig, U., et al. "Dynamic force microscopy by means of the phase-controlled oscillator method", Oct. 15, 1997, pp. 3641-3651, *Journal of Applied Physics*, vol. 82, No. 8.

Franklin, G.F., et al., "Chapter 10 Quantization Effects ", *Digital Control of Dynamic Systems*, 1998, pp. 425-441, Third Edition, Addison-Wesley.

Franklin, G.F., "Basic Properties of Feedback", *Feedback Control of Dynamic Systems*, 2006, pp. 166-229, Fifth Edition, Prentice Hall.

Garner, S. et al., "Force-gradient detected nuclear magnetic resonance", *Applied Physics Letters*, Jun. 21, 2004, pp. 5091-5093, vol. 84, No. 25.

Jacky, J. et al., "Using a Field Programmable Gate Array for MRFM Cantilever Control", Jun. 21-24, 2006, Kavli Institute at Cornell Summer School in MRFM; Retrieved from the Internet on Nov. 7, 2006; www.research.cornell.edu/KIC/events/MRFM2/pdfs/Jack%20talk/jacky-talk.html.

Loppacher, C., et al., "Fast digital electronics for application in dynamic force microscopy using high-Q cantilevers", 1998, pp. S215-S218, Applied Physics A Materials Science & Processing, vol. 66.

Marohn, J. A. et al., An optimal magnetic tip configuration for magnetic-resonance force microscopy of microscale buried features, *Applied Physics Letters*, Dec. 21, 1998, pp. 3778-3780, vol. 73, No. 25.

Wu, B. et al., "A Magnitude/Phase Locked-Loop Approach to Parameter Estimation of Periodic Signals", Jun. 25-27, 2001, *Proceedings of the American Control Conference*, Arlington, VA.

* cited by examiner

ALL-DIGITAL CANTILEVER CONTROLLER

BACKGROUND OF THE INVENTION

1. Technical Field

The invention relates to scanning probe microscopes, such as atomic force microscopes or magnetic resonance force microscopes. More particularly, the invention relates to control systems used for operating a scanning probe microscope.

2. Description of the Prior Art

Since the invention of the scanning tunneling microscope (STM), a variety of other scanning probe microscopes have been developed. Among these, scanning force microscopy (SFM) is the most prominent technique. In SFM, interaction forces acting between a scanned probe tip and a sample are exploited for imaging purposes, similar to the tunneling current in STM. Examples of SFM are atomic force microscopy (AFM), electric force microscopy (EFM), and magnetic resonance force microscopy (MRFM).

The key component in SFM is a tip on a cantilever, which acts as a force sensor. See, e.g. Marohn et al. (1998), Garner et al. (2004), and Struckmeier et al. (2006). When the tip is brought close to the surface of the sample under investigation, the interaction force between the tip and the sample causes a deflection of the cantilever, which behaves as a soft spring. It can be shown that the force gradients acting on the cantilever, in effect, change the cantilever's spring constant, and hence its resonance frequency. See, e.g. Albrecht et al. (1991) and Dürig et al. (1997). By measuring this change in resonance frequency of the cantilever, the interaction force can be measured.

There are several different ways to determine changes in the resonance frequency. One such method is slope detection, where the cantilever is driven off resonance and a change in the resonance frequency is registered as a change in the amplitude of the cantilever response. Another method is phase detection, where the cantilever is driven at resonance, and a change in the resonant frequency is recorded as a change in the phase of the response. Yet another method uses the cantilever as a frequency-determining element in a positive feedback loop. See Albrecht et al. (1991) for a comparison of these methods. The voltage in the loop is demodulated to give the frequency of the cantilever. The frequency-modulation (FM) approach has the advantage of following cantilever frequency shifts which are large compared to the natural width of the cantilever resonance. Another advantage is that its bandwidth is governed only by the characteristics of the FM demodulator.

As with many imaging applications, the more sensitive the measuring apparatus is, the more accuracy it can measure, and the better the quality of its image. This is definitely true for scanned-force microscopy (SFM): the better it can measure the interaction force, or the higher the force sensitivity, the better the quality of its image. This better image quality typically translates to the ability to measure smaller features of the sample one is imaging, i.e. a higher resolution. In SFM, the mechanical properties of the cantilever, which are determined by its dimensions and material properties, ultimately define the sensitivity of the measurement system. However, for a cantilever of given dimensions and material, control of the cantilever motion is instrumental in extracting the best possible information from the measurement system.

Control of a cantilever involves three key components:

1. A sensor to detect the motion of the cantilever, e.g. an optical interferometer that detects the position of the cantilever tip as a function of time;

2. A mechanism to force-actuate the motion of the cantilever, e.g. a piezo element that exerts a force at the base of the cantilever; and 3. An algorithm that computes the force actuation based on the sensor measurements. This algorithm can be a combination of different control loops.

Typically, different parts of the algorithm are exercised for different types of experiments one wishes to perform with the cantilever. Typical control experiments include (but are not limited to):

- Excitation of the cantilever via positive feedback control while locking to the cantilever resonance frequency. This experiment measures the cantilever frequency and shifts in the resonant frequency, which are used for imaging surface topology.
- Optimal feedback control of the cantilever that attenuates the thermo-mechanical fluctuations from the observed cantilever motion to minimize vibration of the cantilever tip.
- Ring-down measurements and observation of thermal fluctuations to calculate the mechanical properties of the cantilever, such as quality factor, resonance frequency, and spring constant.
- Amplitude control of the cantilever tip position, i.e. maintaining a constant amplitude of the observed cantilever motion in the face of frequency changes and/or thermal fluctuations.
- Frequency-shift control of the cantilever tip position, i.e. maintaining a constant frequency-shift of the observed cantilever motion by changing the distance, e.g. height, between the cantilever and the sample.

Currently, the preferred method of implementation of these control experiments is the use of analog components, mainly because analog components are inexpensive and fast. However, there are a number of disadvantages to the use of analog components:

- Each time the mechanical properties of the cantilever change significantly, such as its resonance frequency, some of the analog components must be replaced to maintain stability and performance.
- Similarly, tuning of control experiments requires either adjusting potentiometers or replacing analog components. Besides the tedium and required skill of doing this, there is also a level of uncertainty involved in the final implementation.
- Analog components suffer from thermal drift as the ambient temperature changes during an experiment. This can influence the outcome of an experiment if the experiment is performed over a long period of time. This is especially crucial when imaging, which typically takes a long time. That is, points in the image taken at a later time could be distorted by thermal drift with respect to points taken at the beginning of the image.
- Each of the experiments described above requires a different set of analog components and, thus, the work rack fills up quickly with all the different components, breadboards, and other equipment used for the experiment.

Given these disadvantages, it is no surprise that some people started looking into a digital alternative, i.e. the use of a digital circuit such as a Digital Signal Processor (DSP) or Field Programmable Gate Array (FPGA) for implementing at least some of the abovementioned control experiments. One such an example is the work of Loppacher et al. (1998) who implemented a Phase-Lock-Loop (PLL) with a digitally synthesized clock, and which was able to resolve a small 5 MHz change in a 280 kHz sinusoid with a PLL bandwidth of 500 Hz. Another example is the use of GNU radio, which uses a combination of FPGA and DSP to implement the Optimal Control experiment. A sampling rate of roughly 250 kHz is achieved with 16 bit accuracy, see J. Jacky et al. (2006). Also, there are a number of commercial circuits available, such as frequency counters, lock-in amplifiers, and digital PLL's, which can be used in some of the abovementioned experiments.

The ideal digital controller would be able to do all of the experiments described above and more. It would be comparable in speed to analog components, especially when it comes to experiments that resolve the smallest possible frequency shift. It would be compact in a sense that one small circuit would replace all of the analog components, as well as other units such as lock-in amplifiers, frequency counters, etc., basically providing one box that would replace an entire rack of components. It would have minimal thermal drift, at least an order of magnitude less than analog components. It would have a number of meaningful tuning parameters available, as well as a user-friendly graphical interface (GUI) for adjusting those tuning parameters and performing different types of experiments. Neither the described digital implementations in the literature, nor any of the commercially available digital circuits can meet all of these requirements.

It would be advantageous to provide an approach and implementation that addresses all of these limitations.

SUMMARY OF THE INVENTION

The presently preferred embodiment of the invention, which provides an approach and implementation that addresses all of the above noted limitations of the state of the art, is referred to herein as an All-in-one Digital Cantilever Controller, or simply an All-Digital Cantilever Controller. One key observation is the fact that execution speed of any digital algorithm has to be traded-off against bit accuracy of the algorithm variables, i.e. the more accurate the algorithm, the slower it executes. In addition to being an all-in-one digital algorithm, the disclosed invention also provides an optimal strategy for maximizing algorithm execution speed, whilst maintaining desired algorithm accuracy.

DETAILED DESCRIPTION OF THE INVENTION

Digital Cantilever Control

A recent development in cantilever motion control for Scanning Force Microscopy is the use of digital circuits, such as a Digital Signal Processor (DSP), or Field Programmable Gate Array (FPGA), or a combination thereof. Digital control systems are becoming increasingly more common. Among the advantages of digital controllers are increased flexibility and the complex logic capability of digital systems that are combined with the dynamic control function to meet stringent closed-loop performance specifications. Another advantage is that one hardware platform can be used with many different software variations, leading to the efficient development of a broad range of products. See Franklin et al. (1998). Specifically, two main advantages of digital circuits over analog circuits for cantilever motion control are:

Tunability for different cantilevers and different experiments: Changing algorithms and parameters is very easy to do in a digital circuit using software. In an analog circuit, this typically requires swapping hardware components.

Small thermal drift: Dependent on their clock, digital circuits can have very low thermal drift, oftentimes orders of magnitude lower than analog circuits. This is especially beneficial when performing imaging experiments over a long period of time.

Besides these two advantages, digital circuits also have the advantage of being compact, replacing many analog components with one single circuit board.

Figure 1:
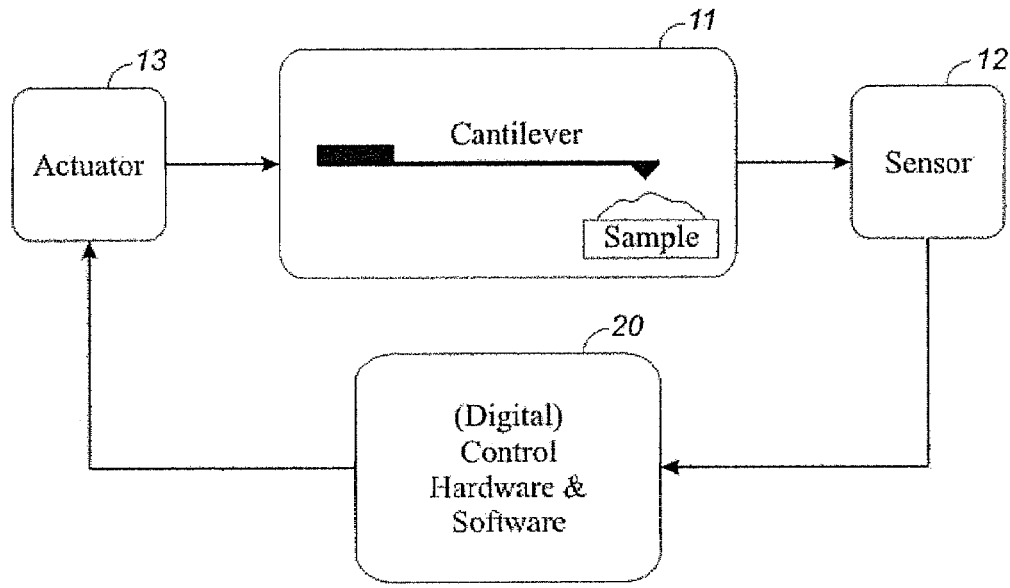
FIG. 1 is a schematic diagram of a typical scanned force microscope acting as a force sensor in a (digitally) controlled loop according to the invention.
Figure 2:
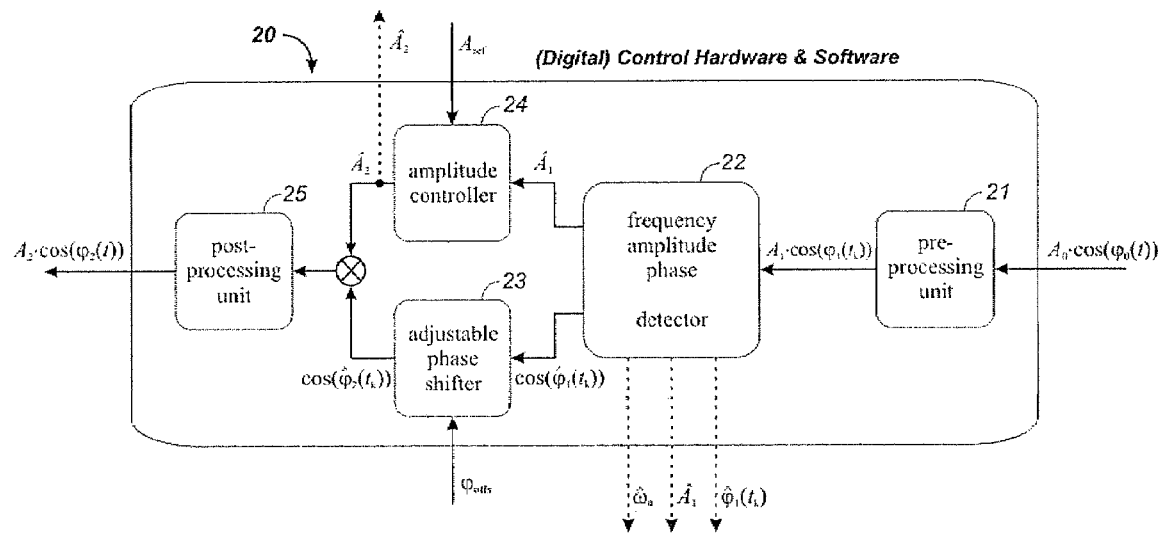
FIG. 2 is a schematic diagram of a digital circuit controlling a scanned force microscope according to the invention.

FIG. 1 is a schematic diagram of a typical scanned force microscope acting as a force sensor in a (digitally) controlled loop according to the invention. FIG. 2 shows a schematic of the digital circuit for controlling the scanned force microscope of FIG. 1.

In FIG. 2, the following legend applies:

| | Legend |
|---|---|
| $A_0$ | amplitude of incoming analog signal |
| $A_1$ | amplitude of incoming sampled signal after scaling |
| $A_2$ | actual amplitude of outgoing (driving) signal |
| $\hat{A}_1$ | estimate of amplitude of incoming sampled signal |
| $\hat{A}_2$ | calculated amplitude of outgoing (driving) signal |
| $A_{ref}$ | amplitude reference value |
| $\phi_0(t)$ | time-dependent phase of incoming analog signal at time t |
| $\phi_1(t_k)$ | time-dependent phase of incoming sampled signal at sampled time $t_k$ |
| $\phi_2(t)$ | time-dependent phase of outgoing analog (driving) signal at time t |
| $\phi_{offs}$ | user-programmable phase offset |
| $\hat{\phi}_1(t_k)$ | estimate of phase of incoming sampled signal at sampled time $t_k$ |
| $\hat{\phi}_2(t_k)$ | adjusted phase of outgoing sampled signal at sampled time $t_k$ |
| $\hat{\omega}_0$ | estimate of cantilever natural frequency |

Digital control of a cantilever involves three key components:

1. A sensor to detect the motion of the cantilever, e.g. an optical interferometer that detects the position of the cantilever tip as a function of time;

2. A transducer to force-actuate the motion of the cantilever, e.g. a piezo element that exerts a force at the base of the cantilever; and 3. A digital circuit for executing an algorithm that computes the force actuation, based on the sensor measurements.

The presently preferred embodiment of the invention concerns the design and implementation of this third component: a software algorithm executed by this digital circuit. This algorithm can be a combination of different control loops. Typically, different parts of the algorithm are exercised for different types of experiments one wishes to perform with the cantilever. Typical control experiments include, but are not limited to:

Excitation of the cantilever via positive feedback control while locking to the cantilever resonance frequency.

Optimal feedback control of the cantilever to attenuate thermo-mechanical fluctuations.

Ring-down measurements and observation of thermal fluctuations.

Amplitude control of the cantilever tip position.

Frequency-shift control of the cantilever tip position.

To understand the nature of the control tasks of the digital algorithm, and the design aspects involved, one first needs to describe the cantilever dynamics and the control problem involved.

Cantilever Dynamics

Let the cantilever be represented by a simple harmonic oscillator with mass m and spring constant k, and dissipative damping d. Its equation of motion under influence of a driving force f is given by:

$$m\ddot{x} + d\dot{x} + kx = f, \qquad (1)$$

yielding a resonance frequency $\omega_0$ $$\omega_0 = \sqrt{\frac{k}{m}}. \qquad (2)$$

Define the dissipation factor Q as $$Q \Box \sqrt{\frac{km}{d^2}} = \frac{\omega_0 m}{d}, \qquad (3)$$

then we can rewrite (1) in its more standard form:

$$\ddot{x} + \frac{\omega_0}{Q}\dot{x} + \omega_0^2 x = \frac{f\omega_0^2}{k}. \qquad (4)$$

The cantilever is coupled to the sample under investigation via the tip-sample interaction. This coupling can be described by an additional spring force $f_s = k_s x$ whose spring constant $k_s$ is equal to the gradient of the tip-sample force. Using Equation (2), we see that this spring force changes the resonance frequency of the cantilever to:

$$\tilde{\omega}_0 = \sqrt{\frac{k+k_s}{m}} = \omega_0 \sqrt{1 + \frac{k_s}{k}}. \qquad (5)$$

Therefore, if the cantilever is vibrating in equilibrium around its resonance frequency, the interaction force gradients can be determined by measuring shifts in the resonance frequency of the cantilever using Equation (5).

Frequency Shift Detection

One of the simplest methods to measure frequency shifts is to excite the cantilever at a fixed frequency close to resonance and to measure its response using a lock-in technique. As already explained, a much more favorable technique is to use the cantilever as a resonator in an active feedback loop, and use frequency modulation (FM) to determine the frequency shift, as first introduced by Albrecht et al. (1991). The two main advantages of this method are:

Force gradients, such as $k_s$, can be unambiguously distinguished from dissipative, i.e. Q-related, interactions from a phase-frequency measurement.

The vibration amplitude of the cantilever is controlled by a feedback loop that is capable of exciting and damping the oscillations.

FIG. 2 shows a block schematic diagram of a (digital) controller hardware and software 20 according to the invention. This controller has at least five distinct components:

1. a pre-processing unit 21;
2. a frequency, amplitude, and phase detector 22;
3. a phase shifter 23;
4. an amplitude controller 24; and
5. a post-processing unit 25.

Pre-Processing Unit (21)

Figure 3:
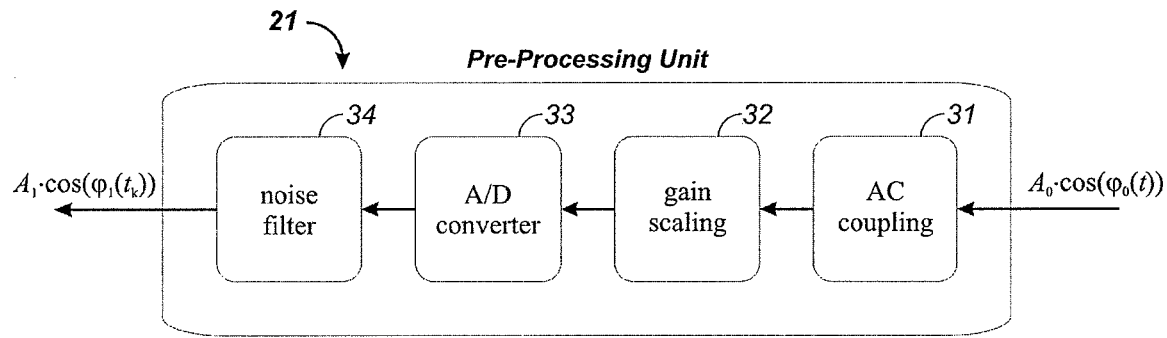
FIG. 3 is a block schematic diagram of a pre-processing unit according to the invention.

The pre-processing unit 21 consists of signal pre-processing software and/or hardware, as well as an Analog-to-Digital (A/D) converter 33, see FIG. 3. Among other things, the pre-processing unit 21 removes any DC component from the raw incoming signal via AC coupling 31. Furthermore, it scales the incoming signal to a range that maximizes use of the available number of bits in the A/D converter 32. If, for example, the A/D converter quantizes the analog signal using sixteen bits, one wants to make sure that the amplitude of the incoming signal is such that it corresponds to a bit close to the Most-Significant Bit (MSB), so that (nearly) all sixteen bits are used to quantize the signal, and not just the least significant bits. Next, the signal is either converted to the digital domain using the A/D converter 33 and then filtered by a noise filter 34, or the signal is first filtered and then converted to the digital domain. The filtering is used to reduce the effect of noise on the incoming signal, and the A/D conversion is necessary to process the signal further in a digital processor.

Frequency, Amplitude, Phase Detector (22)

The frequency, amplitude and phase detector 22 is an important and essential part of the controller. It estimates the phase, frequency, and amplitude of the incoming signal, from which the small frequency shifts that translate to small shifts in cantilever spring constant are determined. It also provides the base signal for driving the cantilever. The amplitude estimation part is used for amplitude control.

Figure 4:
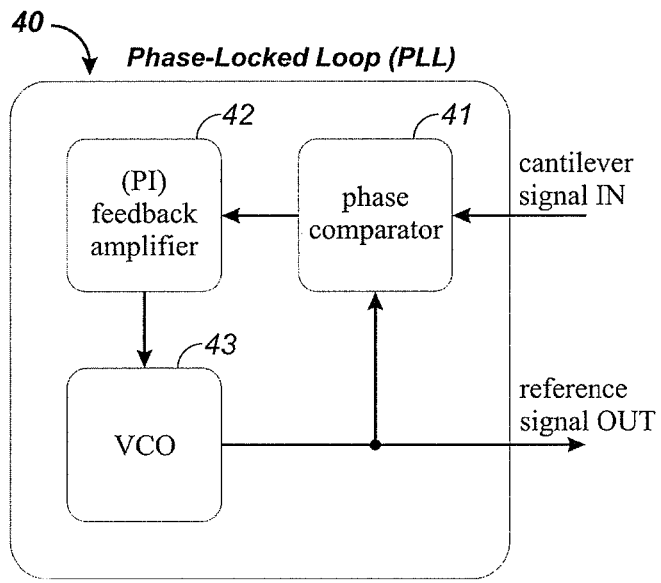
FIG. 4 is a block schematic diagram of a Phase-Locked Loop (PLL) according to the invention.

A common and established way of estimating the phase and frequency of the incoming signal is by using a Phase-Locked Loop 40 (PLL), see FIG. 4. A PLL consists of a phase comparator 41, a feedback amplifier 42, and a Voltage-Controlled Oscillator (VCO) 43. A PLL circuit keeps the phase between the cantilever and the VCO 43 locked by feeding back the phase difference between the cantilever oscillation and the reference oscillator to make them both the same. In the locked-in state, the VCO signal represents a mirror image of the frequency component contained in the cantilever signal. A big advantage of a PLL over other phase/frequency detection schemes, such as a frequency counter, is the fact that it works very well with low signal-to-noise ratios, i.e. noisy signals, and the fact that it serves as both an excitation signal for the cantilever, as well as an accurate frequency detector.

Figure 5:
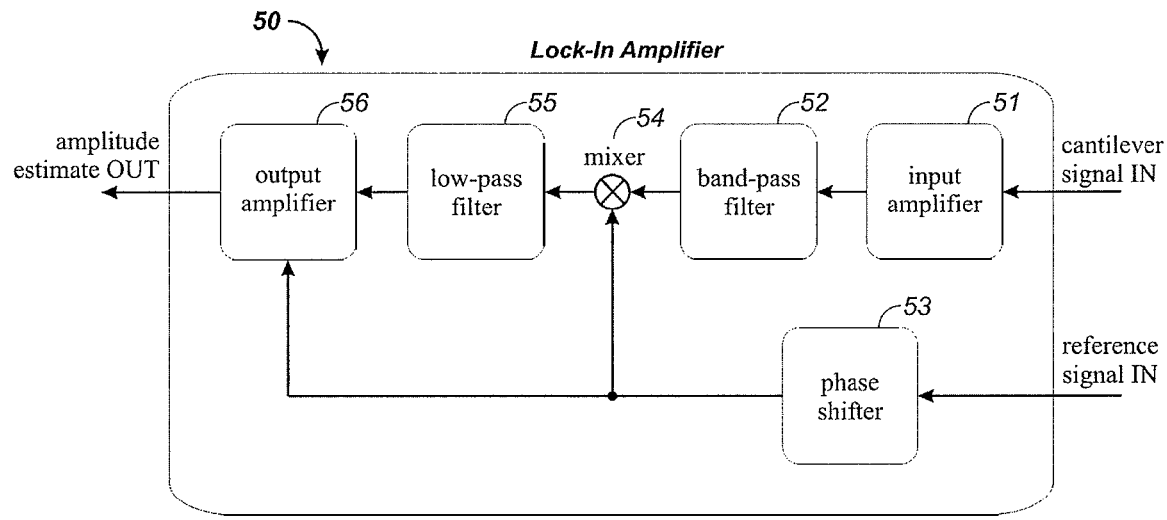
FIG. 5 is a block schematic diagram of a Lock-In Amplifier according to the invention.

For amplitude detection, typically a so-called lock-in amplifier 50 is used, see FIG. 5. The incoming cantilever signal may be amplified by an input amplifier 51, especially when its signal strength is low, and then filtered through a band-pass filter 52 to extract only the frequency content of interest. The lock-in amplifier is supplied with a reference signal at a frequency derived from the same source as the cantilever signal, e.g. the output of the VCO 43. This reference signal is then shifted in phase using a phase shifter 53. The detection process now consists of multiplying these two signals together in a mixer 54, referred to herein as a Phase-Sensitive Detector (PSD). It can be shown that for a sinusoidal input signal and sinusoidal reference signal of the same frequency, the output signal of the mixer contains a DC component that provides an estimate of the amplitude of the cantilever input signal, as well as a sinusoidal component at twice the frequency of the input signal. If this output is filtered with a low-pass filter 55, the higher frequency component is removed, and what remains is the DC component. Finally, an output amplifier 56 scales the final output signal to provide a correct estimate of the actual amplitude of the input signal.

The presently preferred embodiment of the invention uses an algorithm that combines the estimation of the frequency, phase, and amplitude of the incoming signal into a single integrated estimation scheme. Therefore, the need for PLL goes away. Combined frequency, phase, and amplitude estimation of periodic signals in the continuous, i.e. analog, domain is taught by B. Wu and M. Bodson (2001).

Adjustable Phase Shifter (23), (53)

Figure 6:
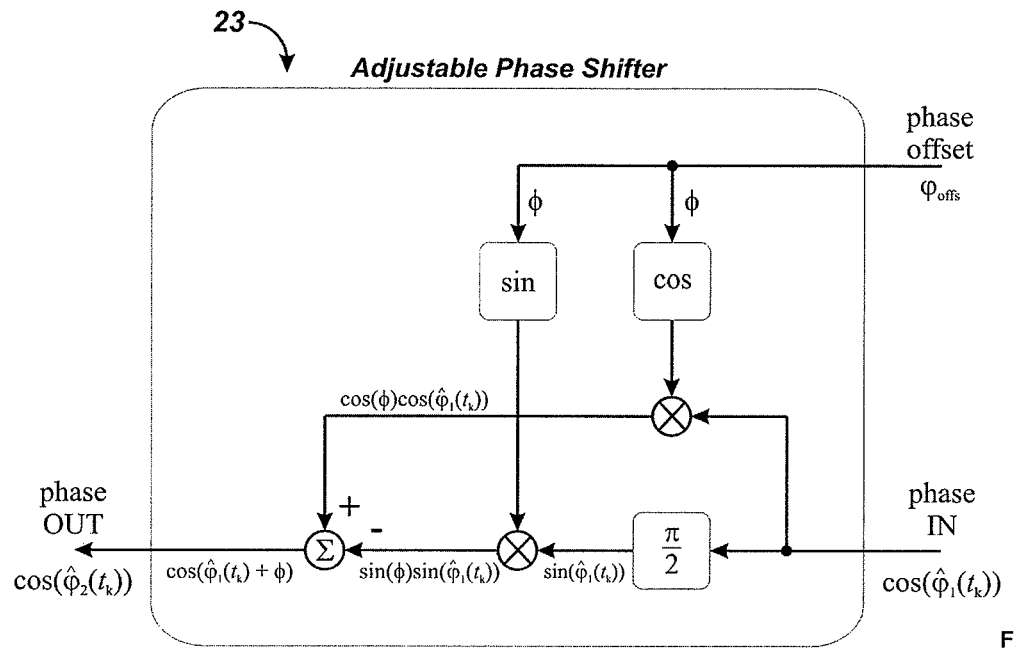
FIG. 6 is a schematic diagram of an Adjustable Phase Shifter according to the invention.

The phase shifter 23, and also 53, allows one to adjust the proper operating conditions for the oscillating cantilever. To generate a driving signal that sustains oscillations of the cantilever, the driving signal must be 90° out of phase with the measured position signal, which can be derived from Equation (1). In addition, the hardware and/or software inhibits a delay from, e.g. A/D and D/A converters, and dynamic filters. The adjustable phase shifter can compensate for this so that the driving signal is perfectly out of phase with the incoming cantilever signal, see FIG. 6. The phase of the incoming signal is modulated by a value $\phi_{offs}$ that includes the 90° out of phase compensation, plus the compensation for hardware and/or software phase delay.

Amplitude Controller (24)

Figure 7:
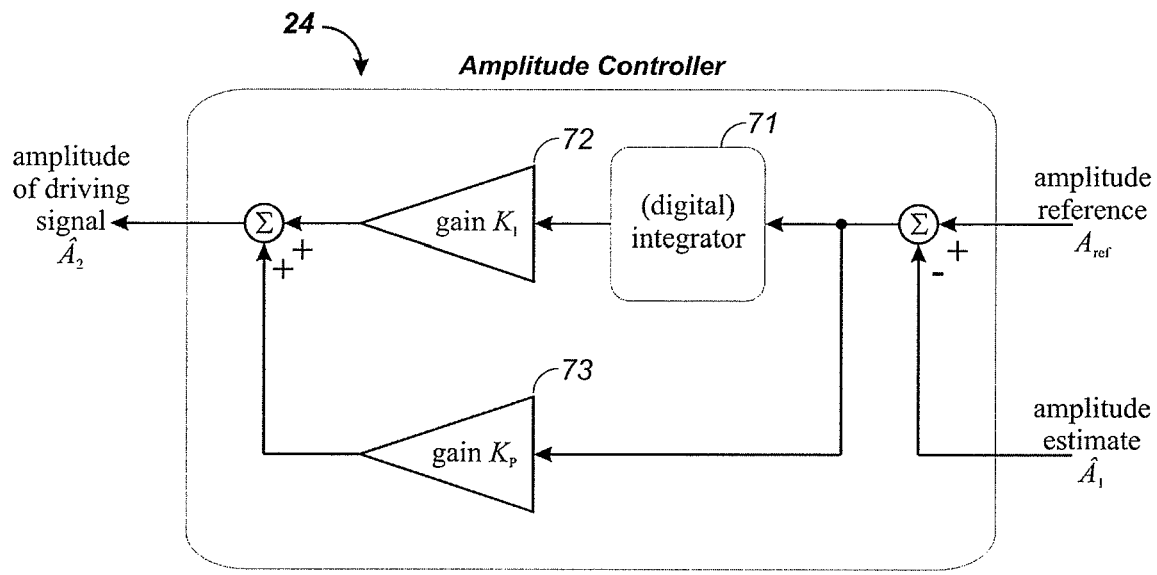
FIG. 7 is a block schematic diagram of an Amplitude Controller according to the invention.

The amplitude controller 24 consists of a standard Proportional-Integral (PI) controller algorithm. See, e.g. Franklin et al. (2006). This controller takes as an input the estimated amplitude $\hat{A}_1$ from the detector 22, as well as a user-programmable reference amplitude $A_{ref}$, and sends the difference between the two to an integrator 71, see FIG. 7. The controller calculates the amplitude of the driving signal, such that the estimated amplitude of the cantilever oscillation is equal to the desired reference amplitude. The integral gain $K_I$ 72 and proportional gain $K_P$ 73 of the algorithm are chosen, such that this feedback loop is stable and short term amplitude fluctuations are damped out. The gain of the controller can assume both positive and negative values, corresponding to excitation and damping of the cantilever oscillations, respectively. The appropriate gain value to use depends on the type of experiment one wants to perform, as explained earlier. In addition, the amplitude of the driving signal can be held constant, e.g. when performing a frequency-shift feedback experiment. The amplitude of the driving signal calculated by this controller is also a relative measure for the Q factor of the cantilever and, therefore, made available to the user.

Post-Processing Unit (25)

Figure 8:
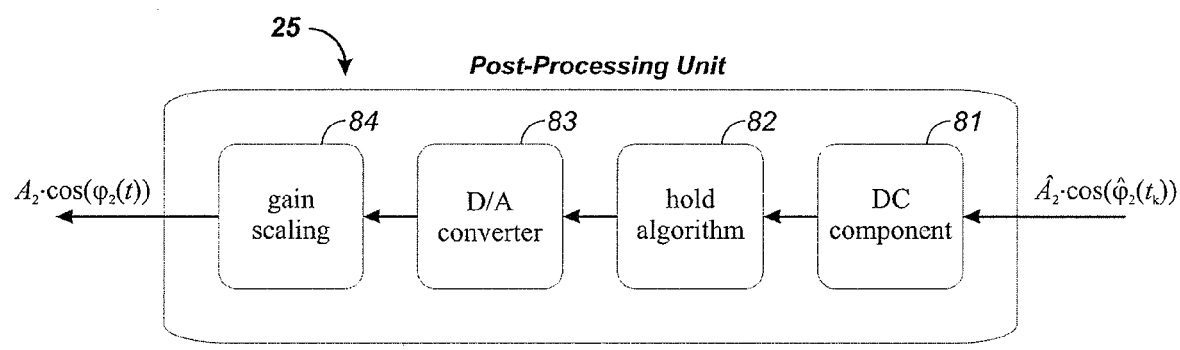
FIG. 8 is a block schematic diagram of a post-processing unit according to the invention.

The post-processing unit 25 consists of any post-processing software and/or hardware, as well as a Digital-to-Analog (D/A) converter 83, see FIG. 8. Among other things, the post-processing unit 25 adds a DC component 81 back to the signal. Furthermore, because the D/A converter usually runs at a much higher sampling rate than the sampling rate at which the driving signal is being updated, the driving signal is held by a hold algorithm 82. The most common hold algorithms are zero-order and first-order hold, but higher order hold algorithms are not excluded. Next, the held signal is converted to the analog domain using a D/A converter 83. The analog signal coming out of the D/A converter can then be scaled to a signal acceptable for the cantilever actuator using gain scaling 84.

All-in-One Algorithm

A unique aspect of the presently preferred embodiment of the invention is the fact that it combines all of the above-described components into a single digital all-in-one algorithm, i.e. the invention constitutes a single digital algorithm that includes signal pre-processing 21, combined frequency, amplitude, and phase detection 22, adjustable phase shifting 23, amplitude control 24, and signal post-processing 25. Not only does this all-in-one algorithm allow for extremely compact code and, therefore allow for maximizing speed of the overall algorithm, but it also provides increased flexibility because one hardware design can be used with many different software variations, and thus can be used for many different Scanned-Force Microscopy (SFM) systems. The software has many user-programmable parameters to configure and tailor it to user-specific experiments. Moreover, the elimination of analog components allows for performing nearly drift-free experiments, which is critical for SFM imaging. In addition, it allows for a very compact hardware design because many individual analog components are replaced by a single component that includes a digital processor together with A/D and D/A converters.

Quantization for Digital Control

Probably, the most intricate part of digital cantilever control is quantization of the control algorithm variables, See, Franklin et al. (1998). Although digital processors are available that can handle floating point variables, it is still true that faster algorithm speeds can be obtained with fixed point, i.e. integer, processors. To appreciate the complexity of quantization of an algorithm for a fixed-point processor, and the issues involved, a brief overview of fixed-point quantization is given.

The presently preferred embodiment of the invention represents numbers by a so-called implied binary point representation, denoted as q[a,b], where a is the integer word-length (IWL) and b is the fractional word-length (FWL). Most variables in the invention are numbers that are signed, two's complement. The word-length (WL) or total number of bits, n, of a signed number q[a,b] is:

$$n = a + b + 1 \tag{6}$$

The value of a specific n-bit binary signed number q in a q[a,b] representation is given by the expression:

$$q = \left(\frac{1}{2^b}\right)\left(-2^{n-1}w_{n-1} + \sum_{i=0}^{n-2} 2^i w_i\right), \quad (7)$$

where $w_i$ represents bit i of q. The range of q[a,b] is given by:

$$-2^a \leq q \leq 2^a - 2^{-b} \quad (8)$$

EXAMPLE

The signed number q[−3,18] has −3+18+1=16 bits and the range is from −2⁻³ to 2⁻³−2⁻¹⁸ or −0.125 to 0.12499618530273. The value 856 Ch (1000,0101,0110,100b) is:

$$\left(\frac{1}{2^{18}}\right)(-2^{15} + 2^2 + 2^3 + 2^5 + 2^6 + 2^8 + 2^{10}) = \frac{-31380}{262144}$$
$$= -0.11970520019531$$

Addition and subtraction

Two signed numbers $q1[a_1,b_1]$ and $q2[a_2,b_2]$ can only be added or subtracted if $a_1=a_2=a$ and $b_1=b_2=b$. If no knowledge of the physical range of the variables q1 and q2 is available, the result q3=q1+q2 should be represented by q3[a+1,b] to prevent overflow or have a carry out. However, in most cases encountered in the invention, the result was determined to be q3[a,b] without having overflow.

Multiplication

The (intermediate) result of multiplying two signed numbers $q1[a_1,b_1]$ and $q2[a_2,b_2]$ is a number with IWL equal to $a_1+a_2+1$ and FWL equal to $b_1+b_2$:

$$q1[a_1,b_1]*q2[a_2,b_2]=q3[a_1+a_2+1,b_1+b_2]. \quad (9)$$

The result of the product has double the word-length of the individual terms and is therefore typically reduced in word-length for subsequent calculations. A product like Equation (9) is denoted as:

$$q3[a_3,b_3]=q1[a_1,b_1]*q2[a_2,b_2]. \quad (10)$$

where q3 appropriately reduces the word-length and applies the correct scaling so that the end-result has the required word-length and precision.

EXAMPLE

The expression q3[4,23]=q1[0,11]*q2[7,16] implies one first has to multiply:

$$q1[0,11]*q2[7,16]=tmp[8,27],$$

then shorten and shift the intermediate result tmp[8,27] such that it becomes q3[4,23], in this case multiply the intermediate result by $2^{23-(11+16)}=2^{-4}=\frac{1}{16}$, or simply shift the intermediate result right by 4:

$$tmp[8,27]>>4=tmp[12,23],$$

and finally shortening this 36 bit number to a 28 bit number by discarding the 8 most significant bits:

$$q[4,23]=tmp[0:4,23].$$

A Method for Producing an Optimal Fixed-Point Controller Algorithm

Algorithm precision, or desired word-length, and algorithm execution speed are conflicting requirements: the higher the desired precision, the longer it takes to execute the calculations. In addition, a typical digital processor only has limited logic resources, also called a processor's real estate. Even if one wishes to do all calculations using 64 bit integers, this is often not possible because of the limited resources.

To find an optimal tradeoff between algorithm speed and precision, the presently preferred embodiment of the invention casts the algorithm quantization problem into the following optimization problem:

Given a minimum set of equations that describes the algorithm, and a desired precision of the algorithm variables of interest, minimize the required word-length for each variable. By minimizing the required word-length for each variable, the speed of the algorithm is maximized. After optimization, just meet the desired precision of the output variables of interest, such as cantilever frequency and/or magnitude of oscillation. Optimization software is written that computes the minimum required word-length for each algorithm variable for a given desired precision of output variables of interest, thus maximizing algorithm speed. After optimization, there is no faster algorithm that still has the desired precision.

The fact that the invention constitutes a very compact algorithm that includes all components, as described in FIG. 2, is a tremendous advantage for maximizing algorithm speed as well because individual components would consume logic resources independently of each other, therefore reducing algorithm speed.

The presently preferred method of the invention for producing an all-in-one digital scanning force microscope controller thus comprises the following steps:

Derivation of a minimal set of (physical) equations that define the entire algorithm, including all targeted cantilever control experiments. This set of equations is solved with the highest-possible precision using floating-point variables.

Breaking-up of complex floating-point equations into smaller equations that can be computed by a specific digital device.

Conversion of floating-point variables to fixed-point variables with a minimal word-length that yields a desired precision of key output variables. This step involves the above-described optimization.

Comparison, e.g. verification, of fixed-point equations against the high-precision floating point equations.

Implementation of the fixed-point equations in a specific digital device.

Potential Applications

Although the invention is described herein with reference to the preferred embodiment, one skilled in the art will readily appreciate that other applications may be substituted for those set forth herein without departing from the spirit and scope of the present invention. Since the invention enables imaging of subsurface features for the first time and has the unique capacity of being able to image nanoscale features with isotopic selectivity, the invention presents the potential for many applications. For example, magnetic resonance is one of the only techniques available for gleaning atomic-scale bonding information from disordered materials. Therefore it is expected that the invention will significantly improve magnetic resonance force microscopy (MRFM) for studying complex disordered materials such as catalytically active composites, fuel cells, and hydrogen storage materials, to list a few examples. The technology will have eventual broad utility, including but not limited to: research of advanced materials, advanced semiconductor devices and nanoelectronics (e.g. individual impurity and defect characterization, assaying spin injection in spintronics devices), emerging solid-state phenomena (e.g. investigations of electron spin coupling mechanisms and quantum computational physics), single molecule analytical chemistry, infectious disease research, and biotechnology. Specifically, the invention would allow one to form a three dimensional picture of any single protein, in situ, with all of its posttranslational modifications in place. It would also allow one to obtain the full structure of any membrane protein and we enable looking at any cell's outer membrane with all the proteins and lipids frozen in action together. It would allow one to focus study on just the reactive part of a molecule or a suspected binding site in a protein. The invention would open the door to studying impure samples, samples that can be isolated in only small quantities, and transient complexes. It would allow one to study the conformational heterogeneity among an ensemble of proteins in situ.

The invention will also enable more powerful imaging in electric force microscopy (EFM) and atomic force microscopy (AFM). The atomic force microscope has become an extremely valuable tool for studying biological systems, and more than one paper a day is published detailing a biological application of atomic force microscopy.

The ability of atomic force microscopy to study biological samples can be dramatically improved with the current invention. Current AFM hardware is poorly suited for state-of-the-art imaging and spectroscopy applications. For example, delicate frequency-shift AFM imaging of biological structures in water requires custom positive-feedback and frequency-measuring hardware, while force spectroscopy and high-speed tapping mode AFM imaging require custom negative-feedback circuitry. The current invention replaces this custom hardware with a single versatile all-digital cantilever controller capable of both types of cantilever control.

Conclusion

Herein disclosed is an innovative approach for cantilever control of Scanned Force Microscopes. The invention provides a method and apparatus that estimates the phase, frequency, and amplitude of the incoming signal, from which the small frequency shifts that translate to small shifts in cantilever spring constant are determined. It also provides the base signal for driving the cantilever. The amplitude estimation part that is used for amplitude control processes real-time cantilever tip deflection measurements and produces real-time commands to force-actuate the cantilever's motion in a desired fashion. A key aspect of the invention is a single digital software and hardware system that integrates many different components of SFM control, such as frequency estimation using a Phase-Locked Loop (PLL), amplitude estimation using a lock-in amplifier, phase compensation using an adjustable phase shifter, amplitude control using an amplitude controller, and more. Besides the advantage of replacing many analog components with one single digital component, a significant advantage of such all-in-one digital controller is the near-elimination of thermal drift during SFM experiments. Another significant advantage is its flexibility because one hardware design can be used with many different user-programmable software variations. Yet another advantage is its automatic adjustment to changing cantilever properties, compared to replacing breadboard components in state-of-the-art analog cantilever control.

Another key observation related to the invention is the fact that execution speed of any digital algorithm has to be traded-off against bit accuracy of the algorithm variables, i.e. the more accurate the algorithm, the slower it executes. In addition to comprising an all-in-one digital algorithm, the disclosed invention also provides an optimal strategy for maximizing algorithm execution speed, while maintaining desired algorithm accuracy.

The foregoing detailed description of the invention is provided for the purpose of illustration and is not intended to be exhaustive or to limit the invention to the precise embodiments disclosed. Accordingly the scope of the present invention is defined by the following Claims.

The invention claimed is:

1. An all-digital controller for a microscope, comprising:
a digital frequency, amplitude, and phase estimator for estimating phase, frequency, and amplitude of an input signal, from which small frequency shifts that translate to small shifts in a cantilever spring constant in said microscope are determined, said digital frequency, amplitude, and phase estimator providing a base signal for driving said cantilever and effecting cantilever position control thereof as an output;
an algorithm, embodied on a computer readable medium, for combining estimation of the frequency, phase, and amplitude of said input signal into a single estimation scheme;
a digital amplitude controller for receiving an estimated amplitude component of said input signal from said estimator and a reference amplitude signal as an input and providing a compensated amplitude for said base signal as an output;
a digital phase shifter for receiving an estimated phase component of said input signal from said phase estimator and a phase offset signal as an input and providing a phase compensated signal as an output; and
a digital oscillator, said oscillator receiving as an input said amplitude controller output and said digital phase shifter output and producing a base signal for driving said cantilever that oscillates the cantilever at or near its resonance frequency.

2. The controller of claim 1, further comprising:
a pre-processing unit comprising signal pre-processing software and/or hardware and an Analog-to-Digital (A/D) converter, said pre-processing unit removing any DC component from a raw signal via AC coupling, said pre-processing unit scaling said input signal to a range that maximizes use of an available number of bits in said A/D converter, said pre-processing unit either converting said signal to the digital domain using said A/D converter and then filtering said signal with a noise filter, or first filtering said signal and then converting said signal to the digital domain, said filtering reducing an effect of noise on said input signal, said A/D conversion allowing said controller to process an output signal in a digital processor.

3. The controller of claim 1, said digital frequency, amplitude, and phase estimator comprising a Phase-Locked Loop (PLL) for estimating phase and frequency of said input signal, said PLL comprising a phase comparator, a feedback amplifier, and a Voltage-Controlled Oscillator (VCO);
wherein said PLL keeps phase between said cantilever and said VCO locked by feeding back a phase difference between cantilever oscillation and a reference oscillator to make them both the same;

wherein in a locked-in state, said VCO signal represents a mirror image of a frequency component contained in a cantilever signal; and wherein said PLL serves as both an excitation signal for said cantilever and as an accurate frequency detector.

4. The controller of claim 1, said digital frequency, amplitude, and phase, estimator comprising:

a lock-in amplifier for amplitude detection, said lock-in amplifier, wherein said lock-in amplifier is supplied with a reference signal at a frequency-derived from a same source as a cantilever signal;

a phase shifter for shifting said reference signal in phase;

a Phase-Sensitive Detector (PSD) for multiplying said reference signal and said cantilever signal together, an output signal of which contains a DC component that provides an estimate of the amplitude of said cantilever signal, as well as a sinusoidal component at twice the frequency of said input signal;

a low-pass filter for filtering a resulting output, wherein a higher frequency component is removed from said signal, and wherein a DC component remains; and an output amplifier for scaling a final output signal to provide a correct estimate of the actual amplitude of said input signal.

5. The controller of claim 1, said digital phase shifter further comprising:

means for adjusting operating conditions for an oscillating cantilever to generate a driving signal that sustains oscillations of the cantilever, wherein a said driving signal is approximately 90° out of phase with said input signal.

6. The controller of claim 1, said digital amplitude controller further comprising:

an amplitude controller comprising a Proportional-integral (PI) controller algorithm, embodied on a computer readable medium, said controller receiving as an input an estimated amplitude from a detector and a user-programmable reference amplitude, said amplitude controller sending a difference between the estimated amplitude and the user-programmable reference amplitude to an integrator, said amplitude controller calculating the amplitude of said driving signal, wherein estimated amplitude of the cantilever oscillation is equal to a desired reference amplitude.

7. The controller of claim 6, wherein gain of the amplitude controller can assume both positive and negative values, corresponding to excitation and damping of the cantilever oscillations, respectively.

8. The controller of claim 7, wherein an appropriate gain value to use depends on a type of experiment one wants to perform.

9. The controller of claim 8, said experiment, comprising any of:

excitation of the cantilever via positive feedback control while locking to the cantilever resonance frequency;

optimal feedback control of the cantilever to attenuate thermo-mechanical fluctuations;

ring-down measurements and observation of thermal fluctuations;

amplitude control of the cantilever tip position; and frequency-shift control of the cantilever tip position.

10. The controller of claim 7, wherein the amplitude of the driving signal is held constant.

11. The controller of claim 7, wherein the amplitude of the driving signal calculated by said amplitude controller is a relative measure for the Q factor of the cantilever and is made available to a user.

12. The controller of claim 1, further comprising:

a post-processing unit comprising post-processing software and/or hardware and a Digital-to-Analog (D/A) converter, said post-processing unit adding a DC component back to a driving signal, said D/A converter running at a higher sampling rate than a sampling rate at which the driving signal is being updated, the driving signal being held by a hold algorithm comprising any of zero-order and first-order (or higher order) hold, wherein the held signal is converted to the analog domain using said D/A converter, and wherein an analog signal output by the D/A converter is scaled to a signal acceptable for the cantilever actuator using gain scaling.

13. The controller of claim 1, said controller comprising a single digital all-in-one algorithm, embodied on a computer readable medium, that comprises signal pre-processing, combined frequency, amplitude, and phase detection, adjustable phase shifting, amplitude control, and signal post-processing.

14. The controller of claim 1, wherein said controller processes and stores data in a format that represents numbers by an implied binary point representation.

* * * * *

UNITED STATES PATENT AND TRADEMARK OFFICE
CERTIFICATE OF CORRECTION

| | | |
|---|---|---|
| PATENT NO. | : 7,574,327 B2 | Page 1 of 1 |
| APPLICATION NO. | : 11/638116 | |
| DATED | : August 11, 2009 | |
| INVENTOR(S) | : Dirk De Roover, La Moyne Porter, II and Abbas Emami-Naeini | |

It is certified that error appears in the above-identified patent and that said Letters Patent is hereby corrected as shown below:

Title Page; item (56);
Page 2, Second Column, lines 8 and 9, quotation marks added for completeness:
"An optimal magnetic tip configuration for magnetic-resonance force microscopy of microscale buried features," should be --"An optimal magnetic tip configuration for magnetic-resonance force microscopy of microscale buried features",--

Column 2, line 65, "MHz" should be --mHz--

Column 5, Equation (3), "Q□" should be --Q =--

Column 6, line 41, "Frequency, Amplitude, Phase Detector (22)" should be centered and white space added before and after this line.

Column 9, line 18, "856 Ch" should be --856Ch--

Column 12, Claim 2, line 48, "from a raw signal" should be --from a raw input signal--

Column 13, Claim 5, line 31, "wherein a said driving signal" should be --wherein said driving signal--

Signed and Sealed this

Twenty-fourth Day of November, 2009

David J. Kappos
*Director of the United States Patent and Trademark Office*